UNITED STATES PATENT OFFICE.

HAROLD A. LEVEY, OF NEW ORLEANS, LOUISIANA.

PLASTIC COMPOSITION AND ART OF PREPARING THE SAME.

1,316,311. Specification of Letters Patent. Patented Sept. 16, 1919.

No Drawing. Application filed April 10, 1917. Serial No. 160,956.

*To all whom it may concern:*

Be it known that I, HAROLD ALVIN LEVEY, a citizen of the United States, residing at New Orleans, in the parish of Orleans and State of Louisiana, have invented a new and useful Improvement in Plastic Compositions and Art of Preparing the Same, of which the following is a specification.

My invention relates to certain plastic compositions containing the fatty esters of cellulose, and to the art of preparing the same. The compositions to which my invention has special reference are those suitable for the manufacture of flexible films, filaments and the like.

An inherent difficulty in the case of cellulose acetate (which is a representative fatty ester of cellulose and commonly used in this art) as a material from which to make films, filaments and the like, is its brittleness and horny-like nature. On the other hand the cellulose nitrates, prepared in the form of a plastic by the aid of even a very volatile solvent of which little is retained in the hardened product, gives a film or filament the inherent flexibility of which is far greater than that of the acetate prepared in a similar fashion. This inherent superiority of the nitrate film has been further enhanced by the addition of certain fatty acids, their glycerids, other esters and oils. Attempts to effect a similar improvement in the properties of the cellulose acetates by the employment of the above substances have failed, however, since it has heretofore been impossible to add to the acetates a sufficient proportion of these softening and toughening agents to obtain the results desired without sacrificing the transparency and strength of the resultant product.

For example, castor oil, which is a common and effective softening agent in nitrate products, renders the acetates turbid, even when employed in very small proportions; and if used in such quantities as to be effective as a softener, produces a composition which is nearly opaque even in thin films, and is furthermore noticeably deficient in tensile strength.

I have discovered that the desired improvement in the physical properties of the acetates or other fatty esters of cellulose, may be effected by incorporating into them a softening and toughening agent carried in nitrates of cellulose, the mixture being prepared with a solvent common to all of the constituents. The proportion of nitrates used as a carrier may be so small that the product retains the essential characteristics, such as non-inflammability, of the acetates, and nevertheless a sufficient proportion of the softener may be present to produce a flexible, tough film, perfectly transparent and of high tensile strength. Softening agents, such as castor oil, palm oil, China wood oil (olein containing oils), and other fatty oils as well as their corresponding acids, which have been heretofore successfully used only in the production of cellulose nitrate compositions, are thus by my invention rendered useful in the manufacture of plastics from acetates, hydrated acetates, formates, and the other cellulose esters of the fatty acid series, imparting to these compounds the same desirable properties.

In carrying out my invention the softening agent, for instance, castor oil, is added to the cellulose nitrate in any amount up to the maximum proportion which the latter will carry in solution. In the case of castor oil about 25% to 30% (by weight relative to the nitrate) may be used. The nitrate is then mixed with the acetate or other fatty ester, the proportions being, for example, 80%–90% acetate, 10%–20% nitrate, the latter including the dissolved softener. It is necessary to employ a solvent such as nitrobenzene, acetic acid or acetone, if partially hydrated cellulose acetate is used, which is a common solvent of the acetates, nitrates and castor oil. The resultant composition may be employed for the manufacture of films, filaments, sheets, or any other purposes to which plastic compositions of this nature are applied. Its transparency, coupled with its toughness, strength, flexibility, and slow-burning qualities render it perfectly suited to a variety of industrial uses the requirements of which have been hitherto imperfectly met.

By the term "China wood oil" as used in the foregoing I intend to define the product known also under the trade-names of Japanese wood oil and tung oil.

While in the foregoing specification I have particularly described the exact method of carrying out the invention, and the preferred proportions of the parts, as well as the chemical theories which I believe to underlie the improved results which I obtain, it will be understood that the invention is not limited to these details nor dependent upon the soundness or accuracy of the chemical theories stated, except in so far as such limitations are included within the terms of the accompanying claims in which it is my intention to claim all novelty inherent in my invention, as broadly as is permissible in view of the prior art.

What I claim as new and desire to secure by Letters Patent, is:—

1. The process of preparing transparent plastic compositions from the fatty esters of cellulose which consists in admixing with cellulose nitrate softening and toughening agents soluble therein but insoluble in fatty esters of cellulose and incorporating the resulting mixture into said fatty esters of cellulose.

2. The process of preparing transparent plastic compositions from hydrated cellulose acetate which consists in admixing with cellulose nitrate a softening and toughening agent soluble therein but insoluble in said acetate and incorporating the resulting mixture in the hydrated cellulose acetate.

3. The improvement in the art of preparing plastic compositions from the fatty esters of cellulose which consists in incorporating into the said fatty esters fatty glycerids carried in cellulose nitrate.

4. The improvement in the art of preparing plastic compositions from the fatty esters of cellulose which consists in incorporating into the said fatty esters castor oil carried in cellulose nitrate.

5. The improvement in the art of preparing plastic compositions from cellulose acetates which consists in incorporating into the said acetates fatty glycerids carried in cellulose nitrate.

6. The improvement in the art of preparing plastic composition from hydrated cellulose acetates which consists in incorporating into the said hydrated acetates fatty glycerids carried in cellulose nitrate.

7. The improvement in the art of preparing plastic compositions from hydrated cellulose acetate which consists in incorporating into the said acetate castor oil carried in cellulose nitrate.

8. A transparent plastic composition comprising a fatty ester of cellulose, a nitrate of cellulose, and a softening and toughening agent.

9. A transparent plastic composition comprising a fatty ester of cellulose, a nitrate of cellulose, and a fatty glycerid.

10. A transparent plastic composition comprising a cellulose acetate, a cellulose nitrate, and a fatty glycerid.

11. A transparent plastic composition comprising a cellulose acetate, a cellulose nitrate, and a fatty oil.

12. A transparent plastic composition comprising hydrated cellulose acetate, cellulose nitrate, and a fatty glycerid.

13. A transparent plastic composition comprising a fatty ester of cellulose, a nitrate of cellulose, and castor oil.

14. A transparent plastic composition comprising an acetate of cellulose, a nitrate of cellulose, and castor oil.

15. A transparent plastic composition comprising a hydrated acetate of cellulose, a nitrate of cellulose, and castor oil.

16. A plastic composition comprising more than 50% of a fatty ester of cellulose, and less than 50% of a nitrate of cellulose carrying a softening and toughening agent in solution therein.

17. A plastic composition comprising more than 50% of cellulose acetate, and less than 50% of cellulose nitrate carrying in solution therein a softening and toughening agent.

18. A plastic composition comprising more than 50% of cellulose acetate, and less than 50% of cellulose nitrate carrying in solution therein a fatty glycerid.

19. A plastic composition comprising more than 50% of hydrated cellulose acetate, and less than 50% of cellulose nitrate carrying in solution a fatty glycerid.

20. A plastic composition comprising more than 50% of hydrated cellulose acetate and less than 50% of cellulose nitrate carrying in solution therein castor oil.

21. A plastic composition comprising 80 to 90% of a fatty ester of cellulose, and 10 to 20% of a nitrate of cellulose carrying a softening and toughening agent in solution therein.

22. A plastic composition comprising 80 to 90% cellulose acetate and 10 to 20% cellulose nitrate carrying in solution a fatty glycerid.

23. A plastic composition comprising 80 to 90% hydrated cellulose acetate and 10 to 20% nitrate of cellulose carrying in solution castor oil.

24. A transparent, tough, flexible filament, film, or sheet, the inflammability of which is not substantially greater than that of paper and comprising substantially a fatty ester of cellulose having its physical properties modified by the addition of a softening and toughening agent carried in solution in cellulose nitrate.

HAROLD A. LEVEY.